United States Patent
Tai et al.

(10) Patent No.: US 7,116,670 B2
(45) Date of Patent: *Oct. 3, 2006

(54) METHOD AND APPARATUS FOR EXTENDING POINT-TO-POINT/ASYNCHRONOUS TRANSFER MODE SERVICES TO CLIENT COMPUTER SYSTEMS

(75) Inventors: Tsung-Yuan C. Tai, Portland, OR (US); David B. Andersen, Hillsboro, OR (US); Charles L. Brabenac, Portland, OR (US); Kevin C. Kahn, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/055,966

(22) Filed: Feb. 11, 2005

(65) Prior Publication Data
US 2005/0147102 A1 Jul. 7, 2005

Related U.S. Application Data

(60) Continuation of application No. 09/949,258, filed on Sep. 7, 2001, now Pat. No. 6,925,083, which is a division of application No. 09/182,585, filed on Oct. 28, 1998, now Pat. No. 6,795,438.

(51) Int. Cl.
*H04L 12/56* (2006.01)
*G06F 15/16* (2006.01)

(52) U.S. Cl. .................. 370/395.2; 370/451; 370/474; 375/222

(58) Field of Classification Search ............ 370/395.2, 370/395.5, 395.51, 395.52, 395.6, 395.61, 370/419, 451, 464, 469, 471, 474, 476; 375/222
See application file for complete search history.

(56) References Cited

U.S. PATENT DOCUMENTS

| 5,544,161 | A | 8/1996 | Bigham et al. |
| 5,710,885 | A | 1/1998 | Bondi |
| 5,756,280 | A | 5/1998 | Soora et al. |
| 5,764,961 | A | 6/1998 | Bhat |
| 5,802,449 | A | 9/1998 | Beller et al. |
| 5,805,636 | A | 9/1998 | Rao et al. |
| 5,812,786 | A | 9/1998 | Seaholtz et al. |
| 5,822,525 | A | 10/1998 | Tafoya et al. |
| 5,825,765 | A | 10/1998 | Menzilcioglu et al. |
| 5,845,077 | A | 12/1998 | Fawcett |
| 5,852,655 | A | 12/1998 | McHale et al. |
| 5,870,628 | A | 2/1999 | Chen et al. |
| 5,883,893 | A | 3/1999 | Rumer et al. |
| 5,883,901 | A | 3/1999 | Chiu et al. |
| 5,896,382 | A | 4/1999 | Davis et al. |
| 5,912,896 | A | 6/1999 | Beighe et al. |
| 5,956,344 | A | 9/1999 | Cole |

(Continued)

OTHER PUBLICATIONS

C.M. Breevoort, "A Multi-Services Communications Architecuture For In-Home USB and IEEE-1394 based devices", IEEE 0-7803-4757-Mar. 1998, pp. 110 and 111.

(Continued)

*Primary Examiner*—Doris H. To
*Assistant Examiner*—Ahmed Elallam
(74) *Attorney, Agent, or Firm*—Blakely, Sokoloff, Taylor & Zafman LLP

(57) ABSTRACT

A method for managing an asynchronous transfer mode (ATM) cell includes transmitting an ATM cell from a server system to a broadband modem. The ATM cell is forwarded from the broadband modem to a client system.

14 Claims, 9 Drawing Sheets

U.S. PATENT DOCUMENTS

| | | |
|---|---|---|
| 5,973,722 A | 10/1999 | Wakai et al. |
| 5,995,606 A | 11/1999 | Civanlar et al. |
| 6,023,474 A | 2/2000 | Gardner et al. |
| 6,026,443 A | 2/2000 | Oskouy et al. |
| 6,028,844 A | 2/2000 | Hao et al. |
| 6,049,531 A | 4/2000 | Roy |
| 6,081,533 A | 6/2000 | Laubach et al. |
| 6,084,880 A | 7/2000 | Bailey et al. |
| 6,118,785 A | 9/2000 | Araujo et al. |
| 6,189,037 B1 | 2/2001 | Adams et al. |
| 6,301,229 B1 | 10/2001 | Araujo et al. |
| 6,310,862 B1 * | 10/2001 | Roy ........................... 370/260 |
| 6,385,203 B1 * | 5/2002 | McHale et al. ............. 370/401 |
| 6,411,988 B1 | 6/2002 | Tafoya et al. |
| 6,512,773 B1 | 1/2003 | Scott |
| 6,529,479 B1 * | 3/2003 | Suzuki .................... 370/236.1 |
| 6,557,108 B1 | 4/2003 | Moore et al. |
| 6,870,834 B1 * | 3/2005 | McHale et al. ............. 370/354 |

OTHER PUBLICATIONS

Kim et al., A Study on B-ISDN signalling interworking function between the ITU-T and the ATM-Forum, IEEE 0-8186-7225-0, pp. 673-676.

PCT International Search Report, PCT/US99/25307, International filing date Oct. 26, 1999, Mar. 21, 2000, 5 Pages.

PCT International Search Report, PCT/US99/25307, International filing date Oct. 26, 1999, May 23, 2001, 5 pages.

Tai et al., "Extending PPP/ATM Services Across Ethernet/USB/IEEE 1394", Sep. 15-18, 1998, ADSL Forum, Singapore.

Tai et al., BMAP: Extenting PPP/ATM Services Across Ethernet/USB/IEEE 1394, Jun. 16-19, 1998 ADSL Forum, Montreal Canada.

Williams Stallings, Data and Computer Communications, 5th edition, Prentice Hall, pp. 342-346.

* cited by examiner

METHOD AND APPARATUS FOR EXTENDING POINT-TO-POINT/ASYNCHRONOUS TRANSFER MODE SERVICES TO CLIENT COMPUTER SYSTEMS

This is a continuation of a U.S. application Ser. No. 09/949,258, filed Sep. 7, 2001 now U.S. Pat. No. 6,925,083, which is a divisional of a U.S. application Ser. No. 09/182,585, filed Oct. 28, 1998, which has now issued as U.S. Pat. No. 6,795,438.

FIELD OF THE INVENTION

The present invention relates to broadband modems. More specifically, the present invention relates to a method and apparatus for extending Point-to-Point Protocol (PPP)/Asynchronous Transfer Mode (ATM) services to client computer systems.

BACKGROUND OF THE INVENTION

Broadband data transmission supports high bandwidth throughput through the use of multiple channels over a single transmission medium at one time. Multiple channels are supported on the single transmission medium through frequency division multiplexing. Broadband data transmission technologies include Integrated Services Digital Network (ISDN) and Asymmetric Digital Subscriber Line (ADSL).

ADSL is a new modem technology that converts existing twisted-pair telephone lines into access paths for multimedia and high speed data communications. ADSL supports data rates of up to 8 Mbps downstream to the user and up to 1.5 Mbps upstream from the user. An ADSL circuit connects an ADSL modem on each end of a twisted-pair telephone line, creating three information channels, a high speed downstream channel, a medium speed upstream channel, and a plain old telephone service (POTS) channel.

Current ADSL modems that support ATM network technology require sufficient processing and memory resources in order to perform the necessary ATM signaling procedures and segmentation and reassembly (SAR) functionality. In addition, in order to support a point-to-point protocol for connecting a client system to the Internet, ADSL modems require sufficient processing and memory resources to run a Layer Two Tunneling Protocol (L2TP) over a User Datagram Protocol/Internet Protocol. The L2TP enables Internet service providers to operate virtual private networks (VPNs). FIG. 1 illustrates the modules that a conversational ADSL modem 100 supports in providing PPP/ATM services to a client computer system 160. The ADSL modem 100 supports a UDP/IP stack 110 and a L2TP stack 120 on a first side that is connected to the client computer system 160 via modem-client connection 150. The ADSL modem 100 also supports an ATM protocol stack 130 on a second side connected to the ADSL physical interface 140. The ATM protocol stack 130 includes an ATM layer 131, segmentation and re-assembly layer (SAR) 132, ATM adaptation layer (AAL) 133, and a signaling (SIG) layer 134. Data received from the ADSL physical interface 140 us processed by the ATM protocol stack 130 on the ADSL modem 100 to retrieve raw data from the payload of an ATM cell. Similarly, data received from the client computer system 160 to be transmitted on the ADSL physical interface 140 is processed by the ATM protocol stack 130 on the ADSL modem 100 to appropriately format the data into ATM cells.

SUMMARY

A method for managing an asynchronous transfer mode (ATM) cell is disclosed. The ATM cell is transmitted from a server system to a broadband modem. The ATM cell is forwarded from the broadband modem to a client system.

BRIEF DESCRIPTION OF THE DRAWINGS

The present invention is illustrated by way of example and not by way of limitation in the figures of the accompanying drawings, in which the like references indicate similar elements in and in which.

DETAILED DESCRIPTION

Figure 2:
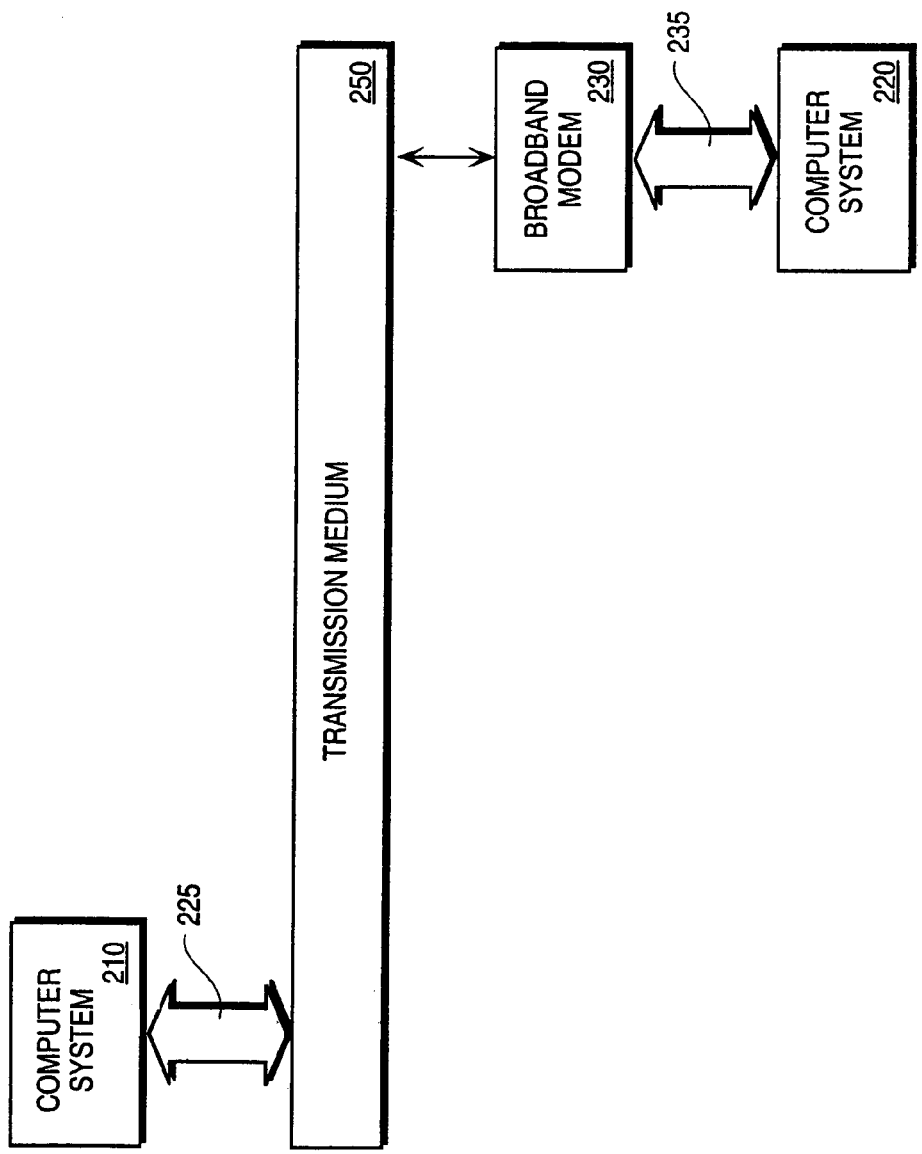
FIG. 2 illustrates a network in which an embodiment of the present invention is implemented.

FIG. 2 illustrates a network 200 in which an embodiment of the present invention is implemented. The network includes a first computer system 210 and a second computer system 220. Data is transmitted between the first computer system 210 and the second computer system 220 via transmission medium 250. The transmission medium 250 may be implemented by a twisted-pair telephone line utilizing ADSL technology, cable, or fiber optics. The data transmitted between the first computer system and the second computer system 220 is formatted using ATM multiplexing and switching method. The second computer system 220 is coupled to the transmission medium 250 via a broadband modem 230. The broadband modem 230 is coupled to the second computer system via a first connection 235. The broadband modem 230 may be, for example, an ADSL modem, a cable modem, or other type of broadband modem. The first connection 235 may be an Ethernet connection, a Universal Serial Bus (Universal Serial Bus Specification, Revision 1.0, January 1996) connection, an IEEE 1394 (IEEE Std. 1394–1995, Standard for a High Performance Serial Bus, August 1996) connection, or other type of connection. The first computer system 210 is coupled to the transmission medium via a second connection 225. The second connection 225 may be a connection to the transmission medium 250 via a connection similar to the first connection 235 and the broadband modem 230. Alternatively, the second connection 225 may be a connection to an intermediary, such as a telephone company, that is coupled to the transmission medium 250. Communication with the intermediary may be achieved through using a Synchronous Optical Network (SONET), Synchronous Digital Hierarchy (SDH), frame relay networking protocol, or other protocols.

According to an embodiment of the present invention, the broadband modem 230 is a peripheral, whereby it operates as a communications peripheral rather than a networking node to the second computer system 220. The broadband modem 230 operates as an interface between the first computer system 210 and the second computer system 220 without performing ATM signaling procedures. The broadband modem 230 forwards ATM cells received from the first computer system 210 to the second computer system 220 without performing reassembly procedures to retrieve data from the ATM cells' payload. Similarly, the broadband modem 230 transmits the ATM cells received from the second computer system 220 to the first computer system 210 without performing segmentation procedures to construct the ATM cell.

The first computer system 210 may be, for example, a server computer system or an Internet service provider (ISP). The second computer system 220 may be, for example, a client computer system such as a personal computer (PC) used at a home or office. It should also be appreciated that the data transmitted between the first computer system 210 and the second computer system 220 may be formatted using other multiplexing and switching methods.

Figure 3:
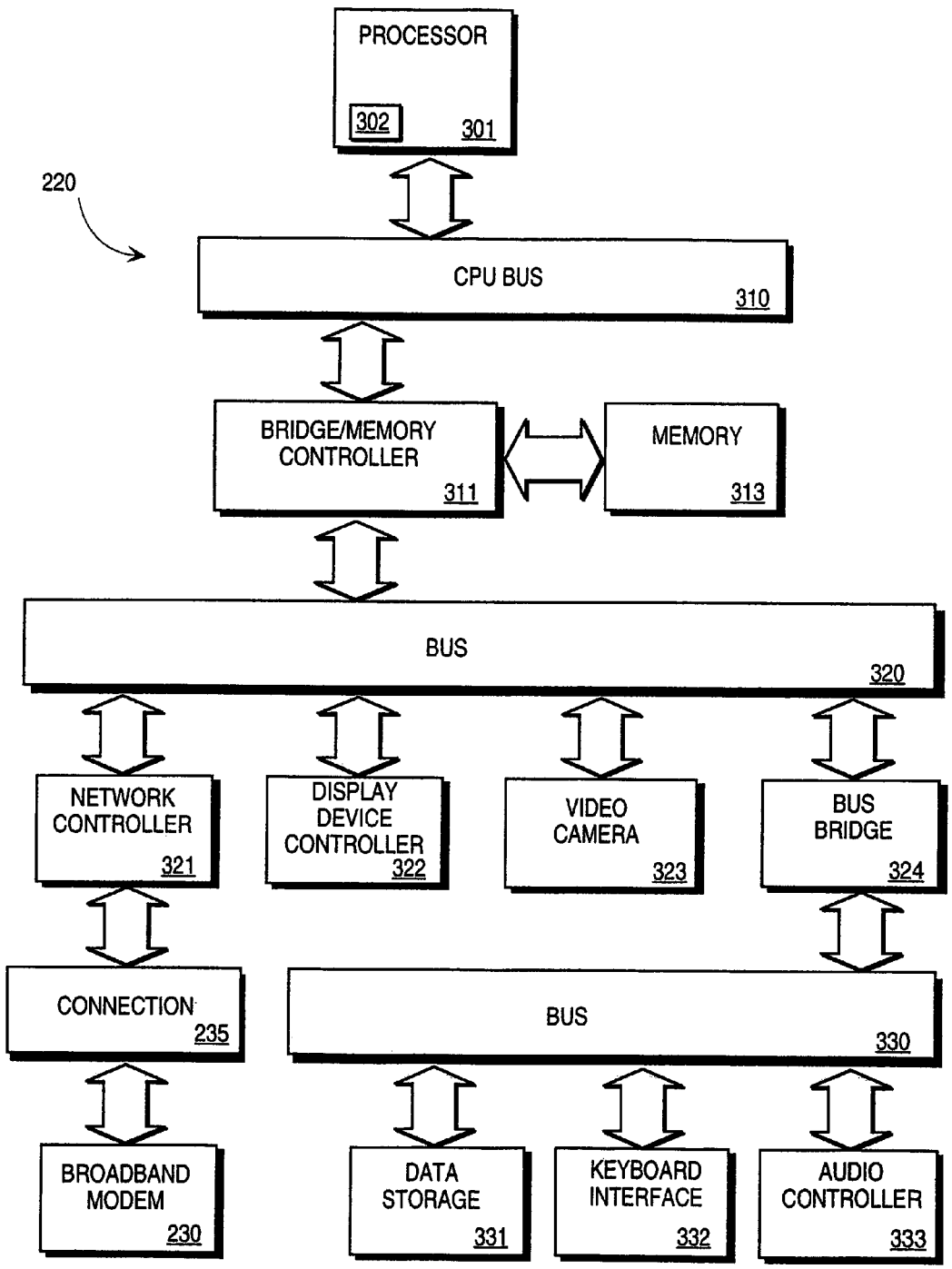
FIG. 3 is a block diagram of a computer system in which an embodiment of the present invention is implemented.

FIG. 3 is a block diagram of the computer system 220 in which an embodiment of the present invention is implemented. The computer system 220 may be implemented as the second computer system 220 illustrated in FIG. 2. The computer system 220 includes a processor 301 that processes data signals. The processor 301 may be a complex instruction set computer (CISC) microprocessor, a reduced instruction set computing (RISC) microprocessor, a very long instruction word (VLIW) microprocessor, a processor implementing a combination of instruction sets, or other processor device. FIG. 3 shows an example of the present invention implemented on a single processor computer system 220. However, it is understood that the present invention may be implemented in a computer system having multiple processors. The processor 301 is coupled to a CPU bus 310 that transmits data signals between processor 301 and other components in the computer system 220.

The computer system 220 includes a memory 313. The memory 313 may be a dynamic random access memory (DRAM) device, a static random access memory (SRAM) device, or other memory device. The memory 313 may store instructions and code represented by data signals that may be executed by the processor 301. A cache memory 302 resides inside processor 301 that stores data signals stored in memory 313. The cache 302 speeds up memory accesses by the processor 301 by taking advantage of its locality of access. In an alternate embodiment of the computer system 220, the cache 302 resides external to the processor 301.

A bridge memory controller 311 is coupled to the CPU bus 310 and the memory 313. The bridge memory controller 311 directs data signals between the processor 301, the memory 313, and other components in the computer system 220 and bridges the data signals between the CPU bus 310, the memory 313, and a first I/O bus 320.

The first I/O bus 320 may be a single bus or a combination of multiple buses. As an example, the first I/O bus 320 may comprise a Peripheral Component Interconnect (PCI) bus, a Personal Computer Memory Card International Association (PCMCIA) bus, a NuBus, or other buses. The first I/O bus 320 provides communication links between components in the computer system 220. A network controller 321 is coupled to the first I/O bus 320. The network controller 321 links the computer system 220 to a network of computers (not shown in FIG. 3) and supports communication among the machines. A display device controller 322 is coupled to the first I/O bus 320. The display device controller 322 allows coupling of a display device to the computer system 220 and acts as an interface between the display device and the computer system 220. The display device controller may be a monochrome display adapter (MDA) card, a color graphics adapter (CGA) card, an enhanced graphics adapter (EGA) card, an extended graphics array (XGA) card or other display device controller. The display device may be a television set, a computer monitor, a flat panel display or other display device. The display device receives data signals from the processor 301 through the display device controller 322 and displays the information and data signals to the user of the computer system 220. A video camera 323 is coupled to the first I/O bus 120. The video camera 323 operates to capture an image of an object. The video camera 323 may be a digital video camera having internal digital video capture hardware that translates the captured image into image data. The video camera 323 may be an analog video camera having digital video capture hardware external to the video camera 323 that digitized the captured image into image data.

Connection 235 is coupled to the network controller 321. The connection 235 represents the first connection 235 shown in FIG. 2. The connection 235 may be an Ethernet connection, a USB connection, an IEEE 1394 connection, or other type of connection. The network controller 321 couples the connection 235 with the first I/O bus 320 and bridges signals between the first I/O bus 320 and the connection 235. A broadband modem 230 is coupled to the connection 235. It should be appreciated that the broadband modem 230 may be an ADSL modem, a cable modem or other type of broadband modem.

A second I/O bus 330 may be a single bus or a combination of multiple buses. As an example, the second I/O bus 330 may comprise a PCI bus, a PCMCIA bus, a NuBus, an Industry Standard Architecture (ISA) bus, or other buses. The second I/O bus 330 provides communication links between components in the computer system 220. A data storage device 331 is coupled to the second I/O bus 330. The data storage device 331 may be a hard disk drive, a floppy disk drive, a CD-ROM device, a flash memory device or other mass storage device. A keyboard interface 332 is coupled to the second I/O bus 330. The keyboard interface 332 may be a keyboard controller or other keyboard interface. The keyboard interface 332 may be a dedicated device or can reside in another device such as a bus controller or other controller. The keyboard interface 332 allows coupling of a keyboard to the computer system 220 and transmits data signals from a keyboard to the computer system 220. An audio controller 333 is coupled to the second I/O bus 330. The audio controller 333 operates to coordinate the recording and playing of sounds.

A bus bridge 324 couples the first I/O bus 320 to the second I/O bus 330. The bus bridge 324 operates to buffer and bridge data signals between the first I/O bus 320 and the second I/O bus 330.

The present invention is related to the use of the computer system 220 to manage a broadband modem. According to one embodiment, managing the broadband modem is performed by the computer system 220 in response to the processor 301 executing a sequence of instructions in main memory 313. Such instructions may be read into memory 313 from another computer-readable medium, such as data storage device 331, or from another source via the network controller 321. Execution of the sequence of instructions causes the processor 301 to manage the broadband modem, as will be described hereafter. In an alternate embodiment, hardwired circuitry may be used in place of or in combination with software instructions to implement the present invention. Thus, the present invention is not limited to any specific combination of hardware circuitry and software.

Figure 4:
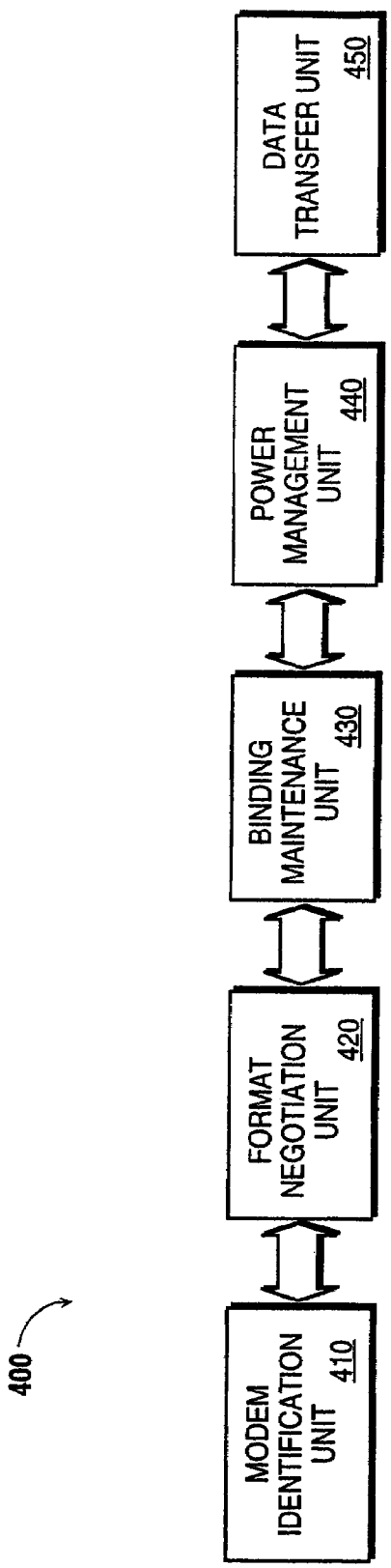
FIG. 4 illustrates a broadband modem access protocol unit implemented in a computer system according to an embodiment of the present invention.

FIG. 4 is a block diagram of a broadband modem access protocol (BMAP) unit 400 according to an embodiment of the present invention. In a preferred embodiment of the present invention, the BMAP unit 400 is implemented by software and resides in main memory 313 (shown in FIG. 3) as a sequence of instructions. It should be appreciated that the BMAP unit 400 may also be implemented by hardware as components coupled to the bus 320 (shown in FIG. 3) or a combination of both hardware and software. The BMAP unit 400 includes a modem identification unit 410. The modem identification unit 410 identifies and selects a BMAP compliant broadband modem coupled to the connection 235 (shown in FIGS. 2 and 3). According to the BMAP, the computer system 220 (shown in FIG. 2) is initially set at a DISCONNECT state. While in the disconnect state, the modem identification unit 410 transmits a DISCOVERY message every T_DISCOVERY seconds where T_DISCOVERY is a predefined period of time. The modem identification unit 410 transmits the DISCOVERY message using a Media Access Control (MAC) layer multicast address until a DISCOVERY ACKNOWLEDGE message from a broadband modem is received. Upon receiving the DISCOVERY ACKNOWLEDGE message, the modem identification unit 410 learns the individual MAC address of the broadband modem and establishes a binding with the broadband modem. When multiple BMAP compliant broadband modems are coupled to the first connection 235, the modem identification unit 410 selects one of the broadband modems to establish a binding with and uses its corresponding MAC address for subsequent correspondences. The modem identification unit 410 transmits a TERMINATE message to the BMAP compliant broadband modems that are not selected. Upon receiving the DISCOVERY ACKNOWLEDGE message, the computer system 220 enters into a CONNECT state.

Figure 1:
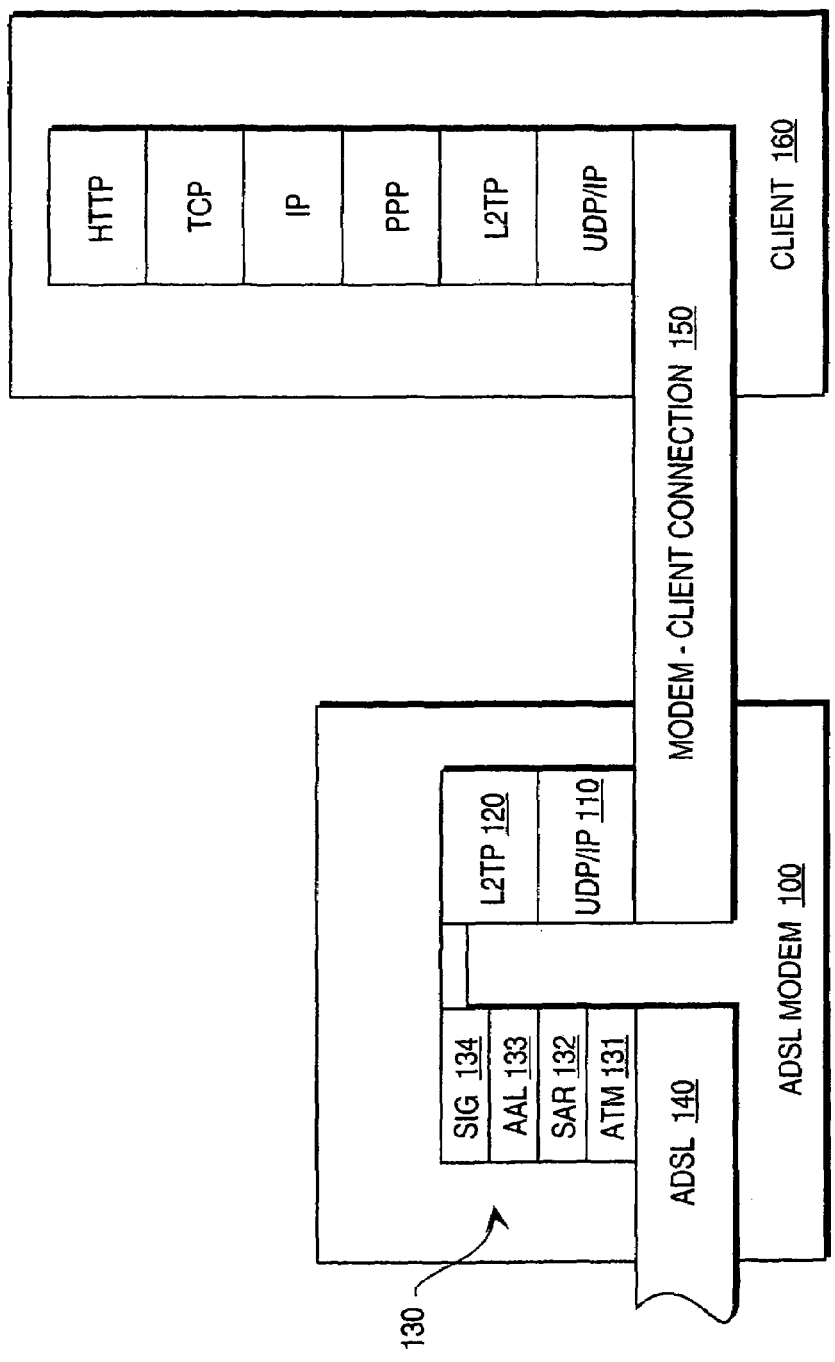
FIG. 1 is a block diagram illustrating the modules that a conventional ADSL modem supports to provide PPP/ATM services to a client computer system.

Non-BMAP compliant computer systems and broadband modems require the local IP network on the first connection 235 to be properly configured as illustrated in FIG. 1. This typically requires that an IP address be assigned to the broadband modem before an end-to-end PPP connection can be established. Home networks without routers and Dynamic Host Configuration Protocol (DHCP) servers will require manual configuration of a static IP address. The modem identification unit 410 facilitates modem identification without requiring a user to manually configure addresses.

A format negotiation unit 420 is coupled to the modem identification unit 410. The format negotiation unit 420 operates to identify the format in which the computer system 220 and the selected broadband modem should use to format data transmitted between the units. The format negotiation unit 420 specifies a number of data formats in the order of preference that the computer system 220 is able to support in the DISCOVERY MESSAGE sent on the connection 235. The broadband modem specifies the subset of data formats it is able to support in the DISCOVERY ACKNOWLEDGE message. The data formats that may be specified by the computer system 220 may include ATM cells, cell header template and concatenated cell payloads, virtual path identifier/virtual channel identifier (VPI/VCI) and AAL5, or other data formats.

A binding maintenance unit 430 is coupled to the format negotiation unit 420. The binding maintenance unit 430 operates to keep active a binding between the computer system 220 and a selected broadband modem. While in the CONNECT state, the binding maintenance unit 430 transmits a POLL message to the selected broadband modem every T_POLL seconds where T_POLL is a predefined period of time. The binding maintenance unit 430 monitors the first connection 235 for a POLL_ACK message sent in response to the POLL message. If the binding maintenance unit 430 does not detect a POLL_ACK message after issuing a predefined number of POLL messages, the computer system 220 will re-enter the DISCONNECT state. Either the computer system 220 or the broadband modem may terminate a binding by sending a TERMINATE message to the other party. Upon receiving the TERMINATE message, the computer system 220 or broadband modem will enter into the DISCONNECT state.

A power management unit 440 is coupled to the binding maintenance unit 430. When the computer system 220 enters a power saving mode, it will no longer be capable of generating regular POLL messages to the broadband modem. The power management unit 440 transmits a SLEEP message to the broadband modem prior to it entering the SLEEP state. Upon receiving the SLEEP message, the broadband modem will enter into a SLEEP state and disable its activity timeout until either a wake-up pattern is sent to the computer system 220, or until the computer system 220 resumes sending data or POLL messages to the modem. The power management unit 440 also transmits a wake-up pattern to the broadband modem. Upon receiving the wake-up signal from the broadband modem, the computer system 220 will exit the SLEEP state.

A data transfer unit 450 is coupled to the power management unit 440. For data formatted as ATM cells, the ATM signaling procedures are performed on the computer system 220. The data transfer unit 450 transfers ATM cells to and from the broadband modem. For data formatted with cell header template and concatenated cell payloads, duplicate cell headers are removed with the rest of the operation remaining the same as described above.

It should be appreciated that the modem identification unit 410, format negotiation unit 420, binding maintenance unit 430, power management unit 440, and data transfer unit 450 may be coupled together in an order different than that shown in FIG. 4. The modem identification unit 410, format negotiation unit 420, binding maintenance unit 430, power management unit 440, and data transfer unit 450 may be implemented using any known circuitry or technique. In an embodiment of the present invention where the BMAP unit 400 is implemented in hardware, the modem identification unit 410, format negotiation unit 420, binding maintenance unit 430, power management unit 440, and data transfer unit 450 all reside on a single semiconductor substrate.

Figure 5:
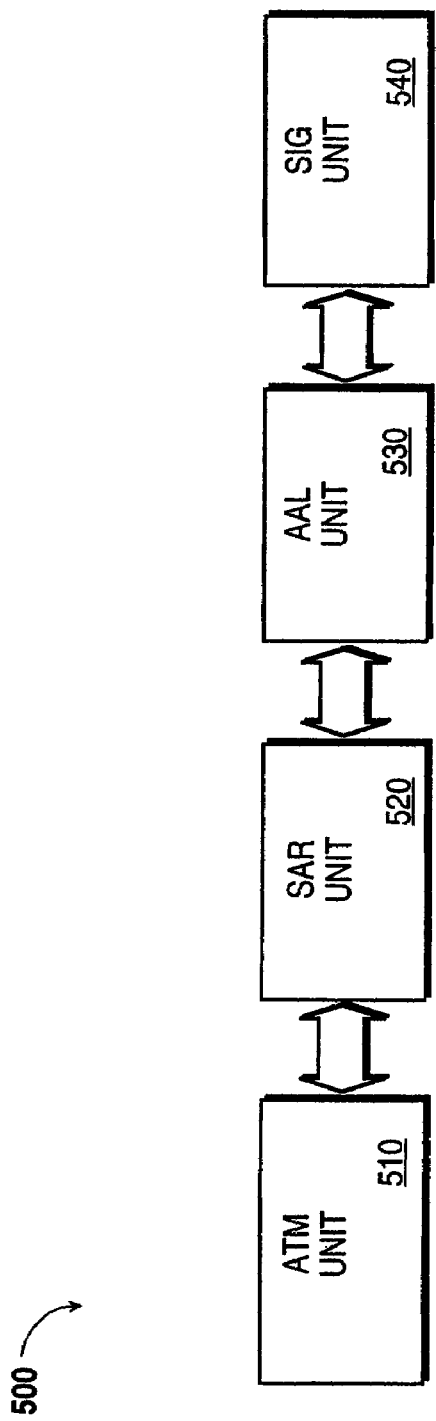
FIG. 5 illustrates an ATM unit implemented in a computer system according to an embodiment of the present invention.

FIG. 5 is a block diagram of an ATM unit 500 according to an embodiment of the present invention. In a preferred embodiment of the present invention, the ATM unit 500 is implemented by software and resides in main memory 313 (shown in FIG. 3) as a sequence of instructions. It should be appreciated that the ATM unit 500 may also be implemented by hardware as components coupled to the bus 320 (shown in FIG. 3) or a combination of both hardware and software. The ATM unit 500 includes an ATM unit 510. The ATM unit 510 operates to perform the functions of cell construction, cell reception and header validation, cell relaying, forwarding and copying, cell multiplexing and demultiplexing, cell payload type discrimination, and other functionalities. An SAR unit 520 is coupled to the ATM unit 510. The SAR unit 520 segments and re-assembles data between the AAL convergence sublayer into the cell payloads of an ATM cell stream. An AAL unit 530 is coupled to the SAR unit 520. The AAL unit 530 defines the headers and trailers in an AAL packet. A SIG unit 540 is coupled to the AAL unit 530. The SIG unit 540 sets up the virtual channels on which the ATM cell will be transmitted.

It should be appreciated that the ATM unit 510, SAR unit 520, AAL unit 530, and SIG unit 540 may be coupled together in an order different than that shown in FIG. 5. The ATM unit 510, SAR unit 520, AAL unit 530, and SIG unit 540 may be implemented using any known circuitry or technique. In an embodiment of the present invention where the ATM unit 500 is implemented in hardware, the ATM unit 510, SAR unit 520, AAL unit 530, and SIG unit 540 all reside on a single semiconductor substrate.

Figure 6:
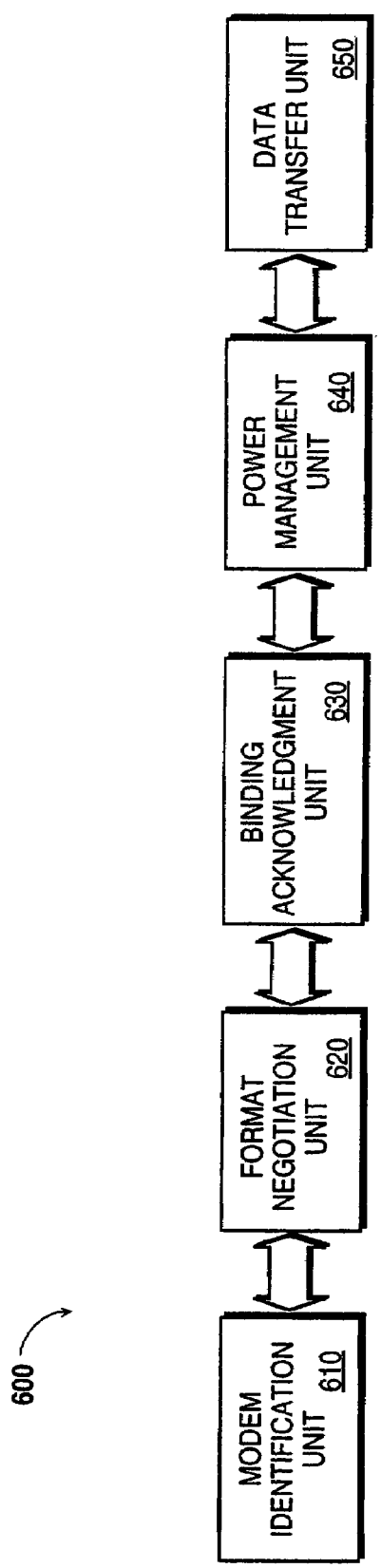
FIG. 6 illustrates a broadband modem access protocol unit implemented in a broadband modem according to an embodiment of the present invention.

FIG. 6 illustrates a BMAP unit 600 implemented in the broadband modem 230 (shown in FIGS. 2 and 3) according to an embodiment of the present invention. The BMAP unit 600 includes a modem identification unit 610. According to the BMAP, the broadband modem 230 is initially set at a DISCONNECT state. Upon receiving a DISCOVERY message from a computer system, the modem identification unit 610 responds by transmitting a DISCOVERY_ACKNOWL-EDGE message to the MAC address of the computer system. When the modem identification unit 610 receives DISCOVERY messages from more than one computer system, the modem identification unit 610 responds to only one of the DISCOVERY messages. Upon receiving the DISCOVERY message, the broadband modem 230 enters into a CONNECT state.

A format negotiation unit 620 is coupled to the modem identification unit 610. The format negotiation unit 620 receives the identity of data formats that the computer system is able to support from the DISCOVERY message. The format negotiation unit 620 specifies the subset of the data formats that the broadband modem 230 is able to support in the DISCOVERY_ACKNOWLEDGE message that is transmitted to the computer system.

A binding acknowledgment unit 630 is coupled to the format negotiation unit 620. In response to receiving POLL messages from the computer system, the binding acknowledgment unit 630 transmits a POLL_ACK message to the computer system. If there is no control or data messages received from the computer system after a third predefined period of time detected by an activity timer of the broadband modem 230, the binding is determined to be broken, and the broadband modem will re-enter into the DISCONNECT state.

A power management unit 640 is coupled to the binding acknowledgment unit 630. The power management unit 640 puts the broadband modem into a SLEEP state in response to receiving a SLEEP message from the computer system. When a wake-up event such as an ATM incoming call arrives or upon receiving a DISCOVERY message from a non-binding computer system while in the SLEEP state, the power management unit 640 of the broadband modem 230 sends a wake-up pattern recorded in the SLEEP message to the computer system and drives the broadband modem 230 into the CONNECT state and starts its activity timer. If the activity timer expires, the broadband modem 230 will re-enter the DISCONNECT state and make itself available for other computer systems.

A data transfer unit 650 is coupled to the power management unit 640. The data transfer unit 650 transfers ATM cells between the transmission medium 250 (shown in FIGS. 2) and the connection 235 (shown in FIG. 2).

It should be appreciated that the modem identification unit 610, format negotiation unit 620, binding acknowledgment unit 630, power management unit 640, and data lo transfer unit 650 may be connected together in an order different than that shown in FIG. 6. The modem identification unit 610, format negotiation unit 620, binding acknowledgment unit 630, power management unit 640, and data transfer unit 650 may be implemented by any known circuitry or technique. In an embodiment of the present invention where the BMAP unit 600 is implemented in hardware, the modem identification unit 610, format negotiation unit 620, binding acknowledgment unit 630, power management unit 640, and data transfer unit 650 all reside on a single semiconductor substrate.

Figure 7:
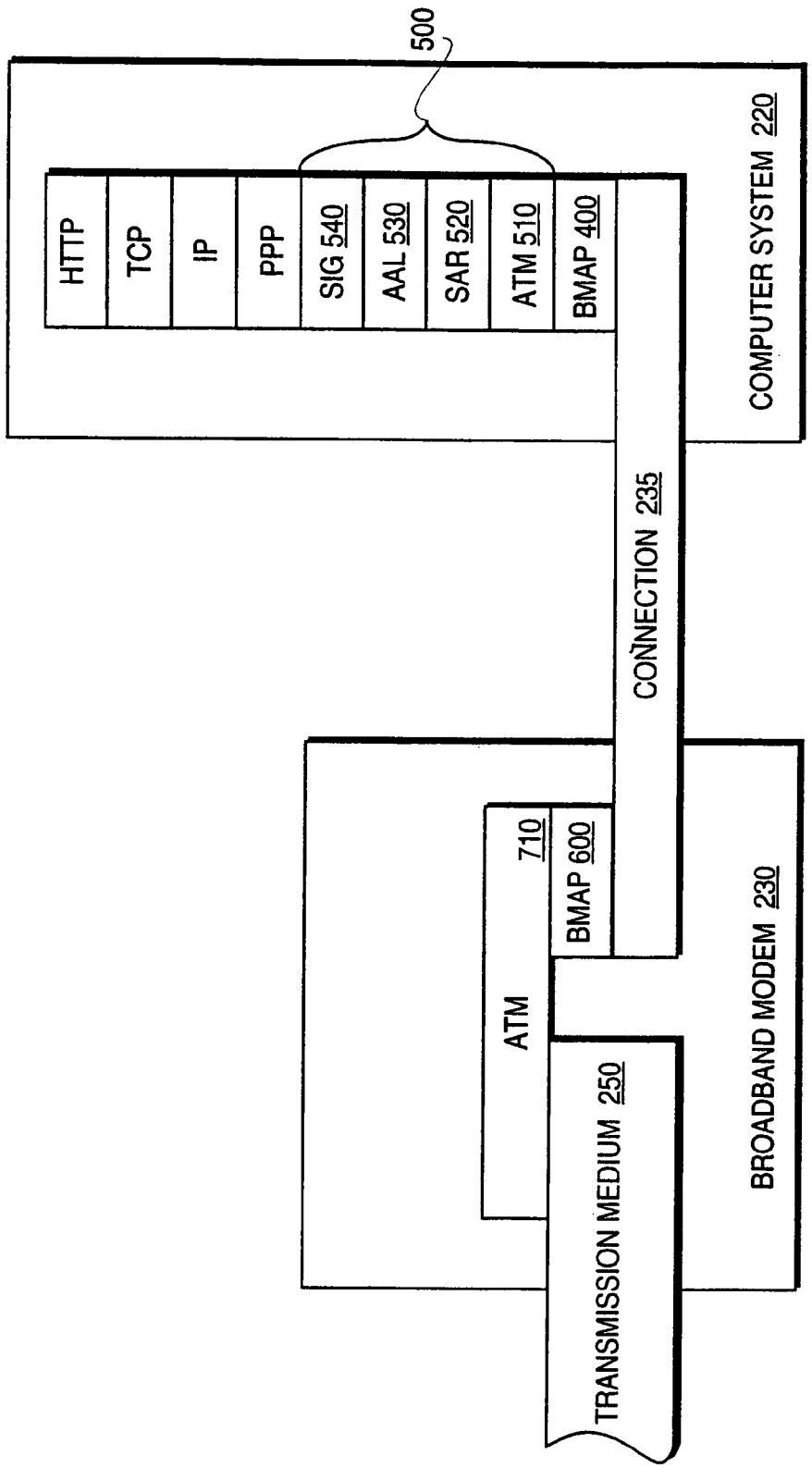
FIG. 7 illustrates the modules that a broadband modem and computer system support to provide PPP/ATM service according to an embodiment of the present invention.

FIG. 7 illustrates the modules that the broadband modem 230 and computer system 220 support to provide PPP/ATM service according to an embodiment of the present invention. Unlike the conventional broadband modem 100 illustrated in FIG. 1, the broadband modem 230 of the present invention operates as a communications peripheral rather than a networking node. The broadband modem 230 operates as an interface between the first computer system 210 and the second computer system 220 without performing ATM signaling procedures and SAR functionalities. The broadband modem 230 forwards ATM cells received from the computer system 210 to the transmission medium 250 without performing segmentation procedures to construct the ATM cell. Similarly, the broadband modem 230 transmits the ATM cells received from the transmission medium 250 to the computer system 210 without performing assembly procedures to receive data from the ATM cells' payload. An ATM unit 710 on the broadband modem 230 also generates and verifies the header control (HEC) field in the ATM cell for upstream and downstream traffic. According to an embodiment of the present invention, the traditional ATM signaling procedures once performed by the signaling stack 130 (shown in FIG. 1) on conventional broadband modems 100 are performed by an ATM unit 500 on the computer system 220. Migrating the ATM signaling procedures onto the computer system allows PPP/ATM services to be extended to client computer systems without requiring L2TP and UDP/IP to be run on broadband modems. This reduces the hardware required for broadband modems and reduces connection and installation procedures necessary for extending PPP/ATM services to client computer systems. It should be appreciated that when the data format negotiated between the broadband modem 230 and the computer system 220 is of the AAL5 format, the SAR unit 520 would be implemented on the broadband modem 230 instead of the computer system 220.

Figure 8:
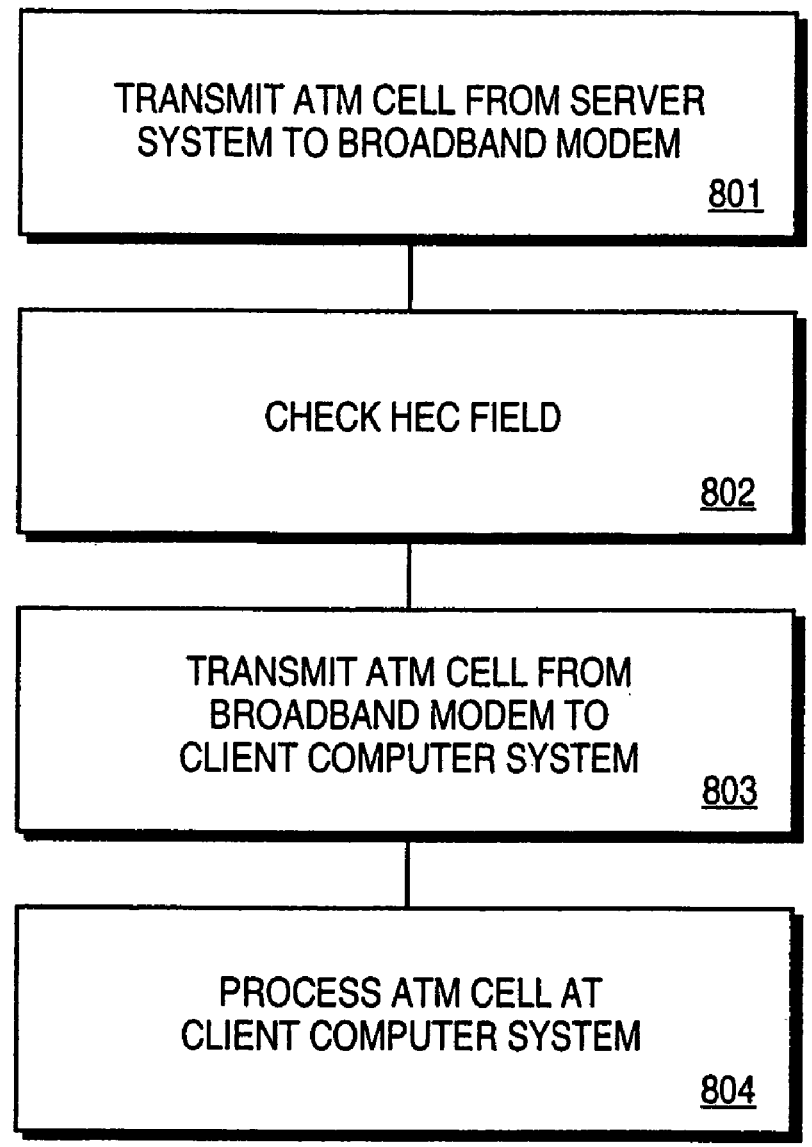
FIG. 8 is a flow chart illustrating a method for managing ATM cells according to an embodiment of the present invention.

FIG. 8 is a flow chart illustrating a method for managing ATM cells according to an embodiment of the present invention. At step 801, an ATM cell is transmitted from a server system to a broadband modem. According to an embodiment of the present invention, the ATM cell may be transmitted over a telephone wire, a cable connection, or other transmission media.

At step 802, the header error control (HEC) field in the ATM cell is checked for corruption before forwarding the ATM cell to the client system.

At step 803, the ATM cell is transmitted from the broadband modem to a client system. According to an embodiment of the present invention, the ATM cell may be transmitted to the client system via an Ethernet connection, USB connection, IEEE 1394 connection, or other connection.

At step 804, the ATM cell is processed at the client computer system to retrieve raw data from a payload section of the ATM cell.

Figure 9:
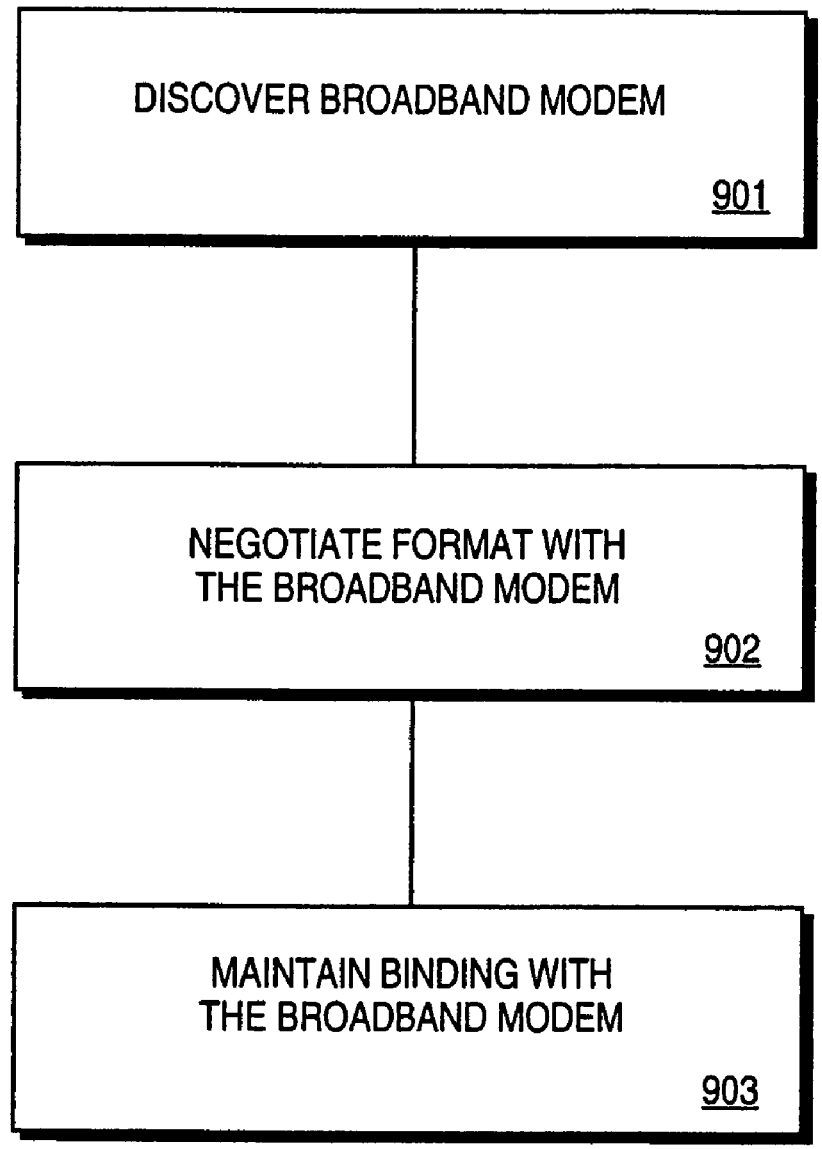
FIG. 9 is a flow chart that illustrates a method for managing a broadband modem according to an embodiment of the present invention.

FIG. 9 is a flow chart that illustrates a method for managing a broadband modem according to an embodiment of the present invention. At step 901, a broadband modem that is connected to a computer system is discovered. According to an embodiment of the present invention, discovery may be achieved by transmitting a discovery signal over a connection and recording a media access control (MAC) address corresponding to the broadband modem that transmits a discovery acknowledge signal in response to the discovery signal.

At step 902, a data format is negotiated with the broadband modem. The data formats may be negotiated by specifying a set of data formats that may be supported in the discovery signal, receiving a subset of data formats that are supportable by the broadband modem in the discovery acknowledge signal, and selecting one of the subset of data formats.

At step 903, a binding between the computer system and the broadband modem is maintained. According to an embodiment of the present invention, the binding is maintained by sending a poll message to the broadband.

What is claimed is:

1. A method, comprising:
   identifying a broadband modem and selecting from a plurality of broadband modems using a Broadband modem access protocol (BMAP) unit including a modem identification unit corresponding to the broadband modem, the BMAP unit is associated with a BMAP-compliant broadband modem (broadband modem) coupled with a network controller via a connection;
   performing at least one of the following using an Asynchronous Transfer Mode (ATM) unit: ATM signaling, segmentation, and re-assembly procedures on ATM cells forwarded between the broadband modem and the network controller;
   transmitting a discovery acknowledge message to a Media Access Control (MAC) address of a client system in response to a discovery signal from the client system;
   receiving identification of data formats;
   transmitting a poll acknowledgement message to the client system in response to receiving a poll message from the client system;
   putting the broadband modem into a sleep state in response to receiving a sleep message from the client system; and
   transferring the ATM cells between the broadband modem and the network controller, after a wake-up pattern is sent to the broadband modem.

2. The method of claim 1, wherein the BMAP unit comprises at least one of the following: a software-based BMAP unit and a hardware-based BMAP unit.

3. The method of claim 1, wherein the ATM unit comprises at least one of the following: a software-based ATM unit and a hardware-based ATM unit.

4. The method of claim 1, further comprising performing at least one of the following: cell construction, cell reception and header validation, cell relaying, forwarding and copying, cell multiplexing and demultiplexing, and cell payload type description.

5. A machine-readable medium having stored thereon data representing sets of instructions which, when executed by a machine, causes the machine to:
   identify a broadband modem and selecting from a plurality of broadband modems using a Broadband modem access protocol (BMAP) unit including a modem identification, unit corresponding to the broadband modem, the BMAP unit is associated with a BMAP-compliant broadband modem (broadband modem) coupled with a network controller via a connection;
   perform at least one of the following using an Asynchronous Transfer Mode (ATM) unit: ATM signaling, segmentation, and re-assembly procedures on ATM cells forwarded between the broadband modem and the network controller;
   transmit a discovery acknowledge message to a Media Access Control (MAC) address of a client system in response to a discovery signal from the client system;
   receive identification of data formats;
   transmit a poll acknowledgement message to the client system in response to receiving a poll message from the client system;
   put the broadband modem into a sleep state in response to receiving a sleep message from the client system; and
   transfer the ATM cells between the broadband modem and the network controller, after a wake-up pattern is sent to the broadband modem.

6. The machine-readable medium of claim 5, wherein the sets of instructions which, when executed by the machine, further cause the machine to perform at least one of the following: cell construction, cell reception and header validation, cell relaying, forwarding and copying, cell multiplexing and demultiplexing, and cell payload type description.

7. A method, comprising:
   forwarding Asynchronous Transfer Mode (ATM) cells between a broadband modem access protocol (BMAP)-compliant broadband modem and a network controller using an ATM unit, wherein the broadband modem, coupled with a bus and the network controller, is identified and selected from a plurality of broadband modems using a modem identification unit of a BMAP unit;
   discovering a modem identification corresponding to the broadband modem using the modem identification unit of the BMAP unit;
   transmitting a discovery acknowledge message to a Media Access Control (MAC) address of a client system in response to a discovery signal from the client system using a modem identification unit;
   receiving identification of data formats using a format negotiation unit, the format negotiation unit coupled with the modem identification unit;
   transmitting a poll acknowledgement message to the system in response to receiving a poll message from the client system using a binding acknowledgement unit, the binding acknowledgement unit coupled with the format negotiation unit;
   putting the broadband modem into a sleep state in response to receiving a sleep message from the client system using a power management unit, the power management unit coupled with the binding acknowledgement unit; and transferring the ATM cells between the broadband modem and the network controller, after a wake-up pattern is sent to the broadband modem, using a data transfer unit, the data transfer unit coupled with the power management unit.

8. The method of claim 7, wherein the ATM unit comprises at least one of the following: a software-based ATM unit and a hardware-based ATM unit.

9. The method of claim 7, wherein the BMAP unit comprises at least one of the following: a software-based BMAP unit and a hardware-based BMAP unit.

10. The method of claim 7, further comprising:

segmenting and reassembling data between an ATM adaptation layer (AAL) convergence sublayer into cell payloads of an ATM cell stream using a segmentation and reassembly (SAR) unit;

defining headers and trailers in an AAL packet using an AAL unit, the AAL unit coupled with the SAR unit; and transmitting the ATM cells using a signaling (SIG) unit coupled with the AAL unit, wherein the transmitting comprises setting up virtual channels.

11. A system, comprising:

an Asynchronous Transfer Mode (ATM) unit to forward ATM cells between a broadband modem access protocol (BMAP)-compliant broadband modem and a network controller, wherein the broadband modem, coupled with a bus and the network controller, is identified and selected from a plurality of broadband modems using a modem identification unit of a BMAP unit; and the BMAP unit including:

the modem identification unit to discover a modem identification corresponding to the broadband modem, and to transmit a discovery acknowledge message to a Media Access Control (MAC) address of a client system in response to a discovery signal from the client system, a format negotiation unit coupled with the modem identification unit, the format negotiation unit to receive identification of data formats, a binding acknowledgement unit coupled with the format negotiation unit, the binding acknowledgement unit to transmit a poll acknowledgement message to the client system in response to receiving a poll message from the client system, a power management unit coupled with the binding acknowledgement unit, the power management unit to put the broadband modem into a sleep state in response to receiving a sleep message from the client system, and a data transfer unit coupled with the power management unit, the data transfer unit to transfer the ATM cells between the broadband modem and the network controller, after a wake-up pattern is sent to the broadband modem.

12. The system of claim 11, wherein the ATM unit comprises at least one of the following: a software-based ATM unit and a hardware-based ATM unit.

13. The system of claim 11, wherein the BMAP unit further comprises at least one of the following: a software-based BMAP unit and a hardware-based BMAP unit.

14. The system of claim 11, wherein the ATM procedures comprise:

segmenting and reassembling data between an ATM adaptation layer (AAL) convergence sublayer into cell payloads of an ATM cell stream using a segmentation and reassembly (SAR) unit;

defining headers and trailers in an AAL packet using an AAL unit, the AAL unit coupled with the SAR unit; and transmitting the ATM cells using a signaling (SIG) unit coupled with the AAL unit, wherein the transmitting comprises setting up virtual channels.

* * * * *